United States Patent
Segawa et al.

(10) Patent No.: US 7,918,257 B2
(45) Date of Patent: Apr. 5, 2011

(54) RUN-FLAT TIRE

(75) Inventors: Masahiro Segawa, Osaka (JP);
Kazutaka Hana, Osaka (JP)

(73) Assignee: Toyo Tire & Rubber Co., Ltd.,
Nishi-ku, Osaka-shi, Osaka (JP)

( * ) Notice: Subject to any disclaimer, the term of this patent is extended or adjusted under 35 U.S.C. 154(b) by 397 days.

(21) Appl. No.: 11/815,594

(22) PCT Filed: Jan. 31, 2006

(86) PCT No.: PCT/JP2006/301500
§ 371 (c)(1),
(2), (4) Date: Aug. 6, 2007

(87) PCT Pub. No.: WO2006/085450
PCT Pub. Date: Aug. 17, 2006

(65) Prior Publication Data
US 2009/0008014 A1    Jan. 8, 2009

(30) Foreign Application Priority Data
Feb. 8, 2005    (JP) ................................. 2005-031643

(51) Int. Cl.
*B60C 17/00* (2006.01)
*B60C 17/04* (2006.01)
*B60C 15/00* (2006.01)
*B60C 15/06* (2006.01)

(52) U.S. Cl. ........ 152/516; 152/517; 152/520; 152/539; 152/545; 152/555

(58) Field of Classification Search .................. 152/539, 152/545, 555, 516, 517, 518, 519, 520
See application file for complete search history.

(56) References Cited

U.S. PATENT DOCUMENTS

| | | | |
|---|---|---|---|
| 4,203,481 A | 5/1980 | Ranik, Jr. | |
| 4,365,659 A | 12/1982 | Yoshida et al. | |
| 4,779,658 A | * 10/1988 | Kawabata et al. | ............ 152/517 |

FOREIGN PATENT DOCUMENTS

DE    3720788    * 1/1988

(Continued)

*Primary Examiner* — Justin Fischer
(74) *Attorney, Agent, or Firm* — Knobbe, Martens, Olson & Bear, LLP (57) ABSTRACT

In the invention, a run-flat tire including a pair of bead portions having an annular first bead, sidewall portions respectively extending to an outer side in a tire diametrical direction from the bead portions, reinforce rubber layers arranged in the sidewall portions, a tread portion connecting outer peripheral side ends of the sidewall portions via shoulder portions, wherein the run-flat tire includes an annular inflating portion provided on the outside in a tire width direction of the bead portion arranged on the outside of the vehicle, and having an inner circumferential side face opposing to an outer circumferential curved side face of a rim flange when a regular rim is fixed; and an annular second bead arranged at the annular inflating portion, wherein the reinforce rubber layer arranged on the outside of the vehicle has a rubber hardness of 60 to 82 degree, the reinforce rubber layer arranged on the inside of the vehicle has a rubber hardness of 65 to 90 degree, and the reinforce rubber layer arranged on the inside of the vehicle has the rubber hardness which is equal to or more than that on the outside of the vehicle, and has a maximum thickness which is larger than that on the outside of the vehicle by at least 0.5 mm.

15 Claims, 2 Drawing Sheets

FOREIGN PATENT DOCUMENTS

| | | |
|---|---|---|
| EP | 0 012 526 A1 | 6/1980 |
| EP | 1 318 031 A1 | 11/2003 |
| FR | 2 346 171 A | 10/1977 |
| JP | 51-116507 | 10/1976 |
| JP | 53-138106 | 12/1978 |
| JP | 55-79707 | 6/1980 |
| JP | 10-138719 | 5/1998 |
| JP | 11321237 | * 11/1999 |
| JP | 2003-326917 | 11/2003 |

* cited by examiner

FIG. 1

FIG.2 ially, there has been no example in which the double bead structure is employed only in the outer side of the vehicle.

RUN-FLAT TIRE

This application is the U.S. National Phase under 35 U.S.C. §371 of International Application PCT/JP2006/301500, filed Jan. 31, 2006, which claims priority to Japanese Patent Application No. 2005-031643, filed Feb. 8, 2005. The International Application was published under PCT Article 21(2) in a language other than English.

TECHNICAL FIELD

The present invention relates to a so-called side reinforcing type run-flat tire provided with a reinforce rubber layer arranged at a sidewall portion.

BACKGROUND ART

Conventionally, there has been known a side reinforcing type run-flat tire in which a reinforce rubber layer is arranged at a sidewall portion. In accordance with the run-flat tire mentioned above, the reinforce rubber layer supports a tire so as to suppress a flattening at a time when an air pressure in an inner portion of the tire is lowered due to a puncture or the like, whereby a run-flat traveling can be executed. In this case, since a pressure application to a rim of a bead portion is weakened in a state in which the air pressure in the inner portion of the tire is lowered (in a run-flat state), a fitting force to the rim is lowered, there is a problem that the bead portion tends to be detached from the rim.

In response thereto, in the following patent documents 1 and 2, there is disclosed a so-called double bead type run-flat tire provided with a first bead arranged in an outer circumferential side of a rim base, and a second bead arranged in an annular inflating portion inflating to an outer side in a tire width direction of a bead portion. In accordance with the run-flat tire mentioned above, since the annular inflating portion reinforced by the second bead is pressed to an outer circumferential curved side face of a rim flange at a time of a run-flat traveling, a fitting force to the rim is increased, and it is possible to improve a rim unseating resistance.

Further, in the conventional double bead type run-flat tire, the second bead also exists in an inner side of the vehicle, however, the second bead in the inner side of the vehicle has a small effect to the bead unseating, and an increase of a tire mass, an increase of a rolling resistance and a reduction of a riding comfortableness are caused by employing the symmetrical double bead structure, additionally.

On the other hand, in the case that the double bead structure is employed in the outer side of the vehicle, and the double bead structure is not employed in the inner side of the vehicle, a difference of deflection amount in the side portions in both sides becomes extremely large at a time of the run-flat. Accordingly, since an asymmetry characteristic of a ground contact pressure distribution of a tread surface becomes extremely large, and there is generated a partial-abrasion and a problem that a drivability is lowered, there has been no example in which the double bead structure is employed only in the outer side of the vehicle.

In this case, the following patent document 3 discloses a pneumatic tire in which a groove area in an outer side of a vehicle than an equator line of a tread is smaller than a groove area in an inner side of the vehicle (a void rate is smaller), and a rubber hardness in the outer side of the vehicle is larger than a rubber hardness in the inner side of the vehicle, however, does not teach a solving means in a technique in which the double bead structure is employed only in the outer side of the vehicle.

Patent Document 1: Japanese Unexamined Patent Publication No. S51-116507
Patent Document 2: Japanese Unexamined Patent Publication No. S53-138106
Patent Document 3: Japanese Unexamined Patent Publication No. 2003-326917

DISCLOSURE OF THE INVENTION

Problem to be Solved by the Invention

Accordingly, an object of the present invention is to provide a run-flat tire which can achieve a reduction of a tire mass, a reduction of a rolling resistance and an improvement of a riding comfortableness, while maintaining a bead unseating performance and a partial-abrasion resistant performance.

Means for Solving the Problems

The object mentioned above can be achieved by the present invention as mentioned below.

In other words, in accordance with the present invention, there is provided a run-flat tire comprising:
a pair of bead portions having an annular first bead;
sidewall portions respectively extending to an outer side in a tire diametrical direction from the bead portions;
reinforce rubber layers arranged in the sidewall portions;
a tread portion connecting outer peripheral side ends of the sidewall portions via shoulder portions,
wherein the run-flat tire comprises:
an annular inflating portion provided on the outside in a tire width direction of the bead portion arranged on the outside of the vehicle, and having an inner circumferential side face opposing to an outer circumferential curved side face of a rim flange when a regular rim is fixed; and
an annular second bead arranged at the annular inflating portion,
wherein the reinforce rubber layer arranged on the outside of the vehicle has a rubber hardness of 60 to 82 degree, the reinforce rubber layer arranged on the inside of the vehicle has a rubber hardness of 65 to 90 degree, and the reinforce rubber layer arranged on the inside of the vehicle has the rubber hardness which is equal to or more than that on the outside of the vehicle, and has a maximum thickness which is larger than that on the outside of the vehicle by at least 0.5 mm. In this case, the rubber hardness indicates a hardness in accordance with a durometer hardness test (A type) of JISK6253.

In accordance with the present invention, it is possible to effectively prevent the bead unseating with respect to a lateral force generated in the outside of the vehicle at a time when the vehicle turns, which most tends to cause the bead unseating in the run-flat traveling state, on the basis of the double bead structure employed in the outside of the vehicle. Further, since it is possible to effectively prevent the bead unseating in the double bead structure, it is possible to make the rubber hardness small or make the thickness small in the reinforce rubber layer in the outside of the vehicle than the reinforce rubber layer in the inside of the vehicle at a time of balancing the deflection amount in both sides. Accordingly, it is possible to achieve the reduction of the tire mass, the reduction of the rolling resistance at a time of the normal traveling, and the improvement of the riding comfortableness at a time of the normal traveling. At this time, since it is possible to balance the deflection amount in both sides by regulating a relation between the rubber hardness and the maximum thickness as mentioned above, it is possible to maintain the partial-abrasion resistant performance at a time of the run-flat traveling.

In the structure mentioned above, a tread pattern formed in the tread portion is preferably structured such that a void rate in the outside of the vehicle is equal to or less than a void rate in the inside of the vehicle on the boundary of a tire equator line. In this case, the void rate means a value obtained by dividing the groove area in each of the regions by a whole area and expressing by a percentage. If the void rate in the outside of the vehicle is equal to or less than the void rate in the inside of the vehicle, the tread center portion generates a buckling in an internal pressure reduced state, and a pattern shear rigidity in the outside of the vehicle having the small void rate becomes larger when the vehicle turns even in the case that a ground contact pressure of the shoulder portion is increased. Accordingly, since a cornering power is increased, it is possible to reduce a slip angle of the tire, and since a moment in the bead unseating direction applied to the tire becomes smaller, it is possible to more effectively prevent the bead unseating.

Further, the tread portion is preferably structured such that at least a cap rubber has a rubber boundary line having a different hardness at a position which is 40 to 60% of the tread width, and the rubber hardness in the outer side of the vehicle of the boundary line is equal to or more than the rubber hardness in the inner side of the vehicle. In this case, the tread width indicates a width of shoulder points in both sides at which an imaginary line extended to the shoulder side at a radius of curvature of the tread surface of the tread pattern intersects two imaginary lines extended to the shoulder side at a radius of curvature of buttresses in both sides, in the tire cross section. Even in this case, since the rubber hardness in the outer side of the vehicle is equal to or more than the rubber hardness in the inner side of the vehicle, the tread center portion generates the buckling in the internal pressure reduced state. Further, since the pattern shear rigidity in the outside of the vehicle having the small void rate becomes larger at a time when the vehicle turns, even in the case that the ground contact pressure of the shoulder portion is increased, the cornering power is increased, so that it is possible to reduce the slip angle of the tire. Further, since the moment in the bead unseating direction applied to the tire becomes smaller, it is possible to more effectively prevent the bead unseating.

DESCRIPTION OF REFERENCE NUMERALS

| | |
|---|---|
| 1 | bead portion |
| 1a | first bead |
| 1b | second bead |
| 2 | sidewall portion |
| 3 | shoulder portion |
| 4 | tread portion |
| 8 | rim |
| 9a | reinforce rubber layer (vehicle outer side) |
| 9b | reinforce rubber layer (vehicle inner side) |
| 10 | annular inflating portion |
| 11 | inner circumferential side face |
| CL | tire equator line |
| A1 | vehicle outer side region |
| A2 | vehicle inner side region |
| A3 | position 40 to 60% of tread width |
| W | tread width |
| TB | boundary line of rubbers having different hardness |

BEST MODE FOR CARRYING OUT THE INVENTION

Figure 1:
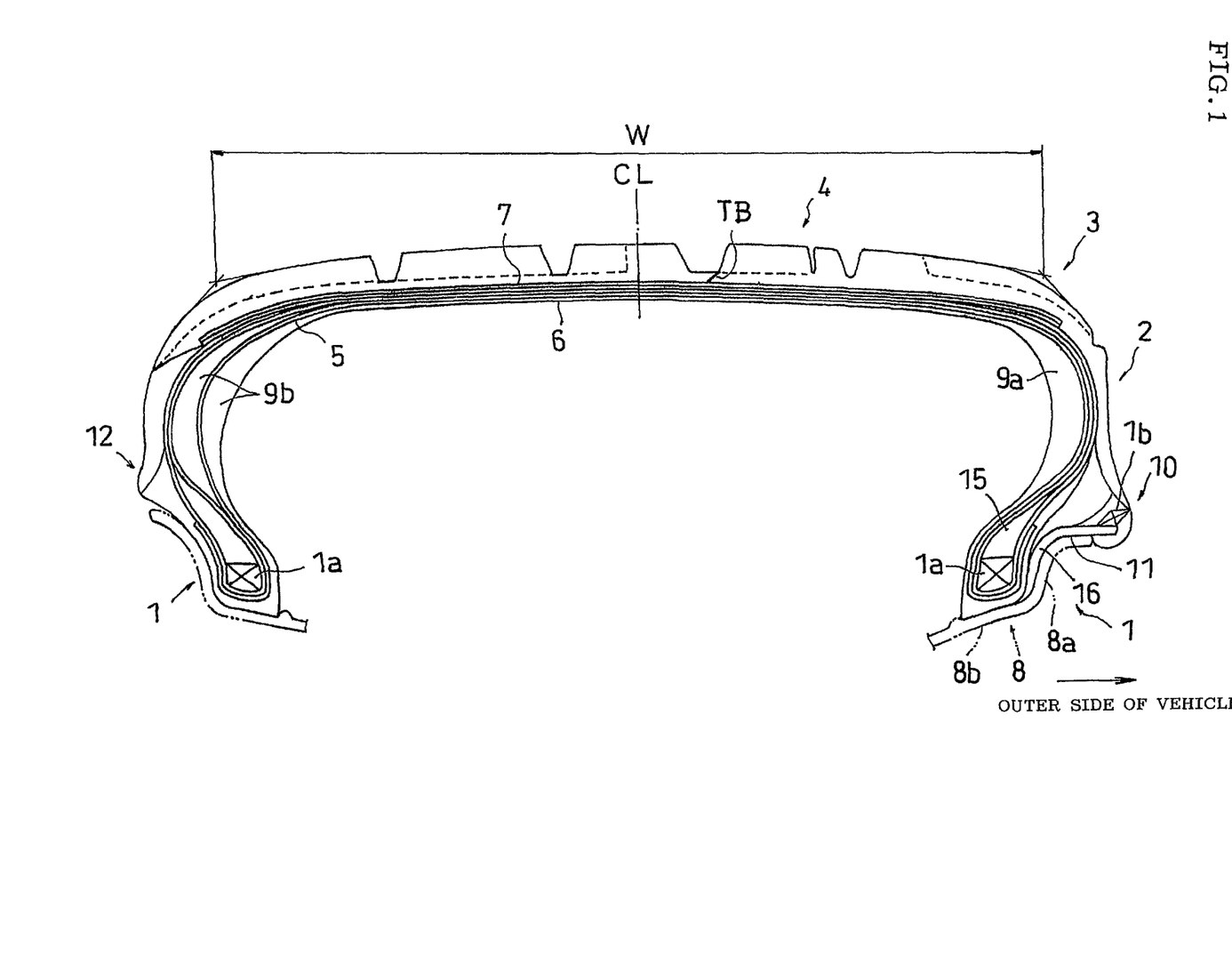
FIG. 1 is a tire meridian cross sectional view showing an example of a run-flat tire in accordance with the present invention.
Figure 2:
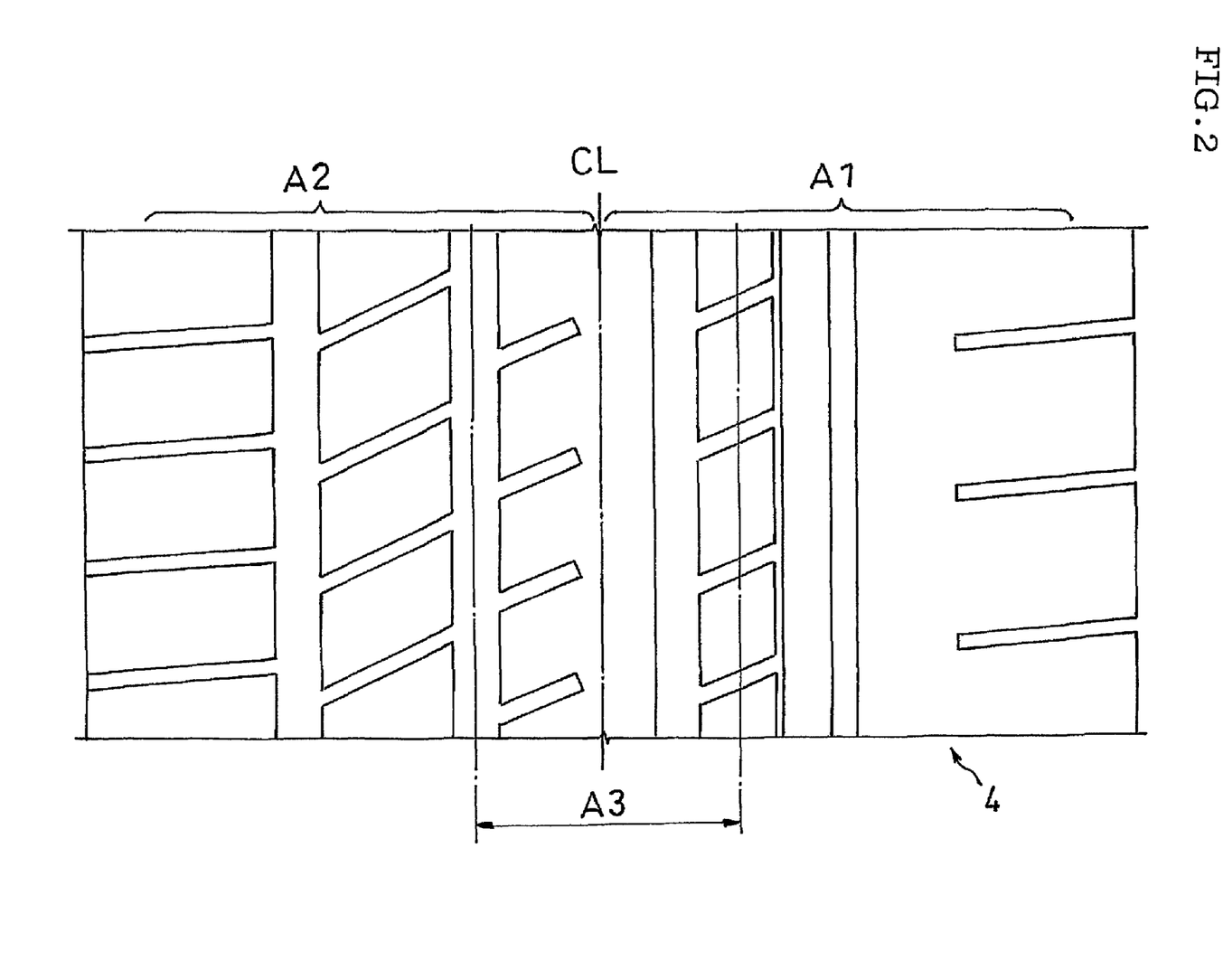
FIG. 2 is an expansion plan view showing an example of a tread pattern of the run-flat tire shown in FIG. 1.

A description will be given below of an embodiment with reference to the accompanying drawings. FIG. 1 is a tire meridian cross sectional view showing an example of a run-flat tire in accordance with the present invention at a time of being installed to a regular rim. FIG. 2 is an expansion plan view showing an example of a tread pattern of the run-flat tire shown in FIG. 1.

The run-flat tire in accordance with the present invention is provided with a pair of bead portions 1, sidewall portions 2 respectively extending to an outer side in a tire diameter direction from the bead portions 1, and a tread portion 4 connecting the respective outer peripheral side ends of the sidewall portions 2 to each other via shoulder portions 3, as shown in FIG. 1.

In the bead portion 1, there are arranged a bead 1a (corresponding to the first bead) in which a converged body of bead wires, for example, constituted by a steel wire is formed in an annular shape in a tire circumferential direction, and a bead filler 15. The tire is firmly fitted and attached onto a rim 8 in a state in which a portion between the bead portions 1 is reinforced by a carcass layer 5, by winding back an end portion of the carcass layer 5 by the bead 1a so as to lock. Further, at a time of a normal internal pressure, the bead portion 1 is arranged in the tire outer circumferential side of a rim base 8b of the rim 8, and is pressed to the rim flange 8a on the basis of an air pressure in the inner portion of the tire.

An inner liner layer 6 for maintaining the air pressure is arranged in an inner circumferential side of the carcass layer 5. Further, a belt layer 7 for reinforcing on the basis of a hoop effect is arranged in an outer circumferential side of the carcass layer 5, and a tread pattern is formed by a tread rubber on an outer circumferential surface of the belt layer 7. As a constructing material of the carcass layer 5 and the belt layer 7, it is possible to use a steel, an organic fiber such as a polyester, a rayon, a nylon, aramid and the like. These materials are normally applied a surface treatment, an adhesion treatment or the like for increasing an adhesive property with the rubber.

A reinforce rubber layer 9 in which a tire meridian cross section is formed approximately in a crescent shape is arranged in an inner side of the carcass layer 5 of the sidewall portion 2. Accordingly, when an air pressure in the inner portion of the tire is lowered, a flattening of the tire is suppressed, and a run-flat traveling can be executed.

As a raw material rubber of the rubber layer or the like mentioned above, there can be listed up a natural rubber, a styrene butadiene rubber (SBR), a butadiene rubber (BR), an isoprene rubber (IR), a butyl rubber (IIR) and the like, and these materials are used independently by one kind, or by being mixed two or more kinds. Further, these rubbers are reinforced by a filler such as a carbon black, a silica or the like, and are appropriately blended with a vulcanizing agent, a vulcanization accelerator, a plasticizing material, an age resistor or the like.

In the present invention, as shown in FIG. 1, a double bead structure is employed only in the outside of the vehicle at a time of being installed to the tire. In other words, the structure is provided with an annular inflating portion 10 provided on the outside in the tire width direction of the bead portion 1 arranged in the outside of the vehicle, and having an inner circumferential side face 11 opposing to an outer circumferential curved side face of the rim flange 8a when the regular rim is fixed, and an annular second bead 1b arranged at the annular inflating portion 10.

In the present embodiment, the inner circumferential side face 11 of the annular inflating portion 10 is brought into contact with the outer circumferential curved side face of the rim flange 8a, a diameter reduced portion holding a leading end of the rim flange 8a exists, and the second bead 1b is provided in the tire outer circumferential side of the diameter reduced portion. The annular inflating portion 10 is smoothly connected to the sidewall portion 2 in a state in which the portion provided with the second bead 1b is set to an approximately top portion. Further, the annular inflating portion 10 is not limited to the shape shown in the present embodiment, but may be structured, for example, such that the tire meridian cross section is formed in a semicircular shape, a trapezoidal shape or the like.

A hardness of the rubber mainly constituting the annular inflating portion 10 is preferably set to 66 to 76 degree for maintaining a bead unseating resistance and a rim displacement resistance and improving a riding comfortableness while taking into consideration the matter that the rubber hardness of the reinforce rubber layer 9a in the outside of the vehicle is made small.

The bead 1b (corresponding to the second bead) in which the bead wire is formed in an annular shape in the tire circumferential direction is arranged in the annular inflating portion 10. The bead 1b in accordance with the present embodiment is arranged in such a manner that a center position is positioned in a tire outer circumferential side from an outermost diameter point of the rim flange 8a and in an outer side in the tire width direction, at a time of being installed to the rim. The bead wire constituting the bead 1b is not limited to the structure constituted by the converged body of the same steel wires as those of the bead 1a, but may be constituted, for example, by a converged body of organic fibers or a rubber bead made of a fiber reinforcing rubber.

On the other hand, in the present embodiment, a rim protector 12 protecting the rim flange 8a when the regular rim is fixed is provided in the outer side in the tire width direction of the bead portion 1 arranged in the inside of the vehicle, however, the structure may be made such as to form a shape smoothly connected to the sidewall portion 2 from a disconnected position from the rim flange 8a without setting the rim protector 12.

In the present invention, the reinforce rubber layer 9a arranged on the outside of the vehicle has a rubber hardness of 60 and 82 degree, and preferably has a rubber hardness of 65 and 78 degree. If the rubber hardness is less than 60 degree, a run-flat durability and a bead unseating performance become insufficient, and if the rubber hardness gets over 82 degree, it is impossible to balance with a deflecting amount of the inner side of the vehicle at a time of the run-flat, a partial-abrasion tends to be generated, and it is impossible to achieve an improvement of the riding comfortableness.

Further, the reinforce rubber layer 9b arranged on the inside of the vehicle has a rubber hardness of 65 and 90 degree, and preferably has a rubber hardness of 70 and 85 degree. If the rubber hardness is less than 65 degree, it is impossible to balance with the deflecting amount of the inside of the vehicle at a time of the run-flat, and the partial-abrasion tends to be generated, and if the rubber hardness gets over 90 degree, the reduction of the ride comfortableness tends to be generated.

Within the range of the rubber hardness mentioned above, the reinforce rubber layer 9b arranged in the inside of the vehicle has the rubber hardness equal to or more than the rubber hardness of the reinforce rubber layer 9a arranged in the outside of the vehicle, and the reinforce rubber layer 9b preferably has the rubber hardness which is larger than the rubber hardness of the reinforce rubber layer 9a by at least 5 degree.

The reinforce rubber layer 9b arranged in the inside of the vehicle has a maximum thickness which is larger than that of the reinforce rubber layer 9a arranged in the outside of the vehicle by at least 0.5 mm, and preferably has a maximum thickness which is larger than that of the reinforce rubber layer 9a by 0.8 to 1.5 mm. Specifically, for example, the maximum thickness of the reinforce rubber layer 9a arranged in the outer side of the vehicle is between 9 and 12 mm, and the maximum thickness of the reinforce rubber layer 9b arranged in the inside of the vehicle is between 9.8 and 13.5 mm.

Further, the reinforce rubber layers 9a and 9b are not limited to be constituted by the single rubber layer, but may be structured by a plurality of rubber layers having different physical properties such as a hardness or the like. In this case, it is sufficient that an average value of the rubber layers in the respective layers is within the range mentioned above.

In the illustrated embodiment, the reinforce rubber layer 9a arranged in the outside of the vehicle is formed by a single rubber layer, the reinforce rubber layer 9b arranged in the inside of the vehicle is formed by two rubber layers, and the carcass layer 5 exists between both layers. In this embodiment, the carcass layer 5 is constructed by two layers, and the reinforce rubber layer 9b is arranged in an inside of each of the carcass layers 5 positioned in the sidewall portion 2. In this case, in the outside of the vehicle, the reinforce rubber layer 9a is arranged in an inside of two carcass layers 5 positioned in the sidewall portion 2.

In the present invention, a reinforcing layer 16 may be arranged approximately along an inner circumferential face of the annular inflating portion 10, whereby it is possible to reinforce an inner circumferential face of the annular inflating portion 10 so as to suppress an attrition. As the reinforcing layer 16, there can be exemplified a chafer constructed by a steel cord, or an organic fiber such as a rayon, a nylon, a polyester, an aramid or the like.

The tread portion 4 in the present invention has a tread pattern, for example, as shown in FIG. 2. In the present invention, it is preferable that the tread pattern formed in the tread portion 4 is structured such that a void rate of a vehicle outer side region A1 is equal to or less than a void rate of a vehicle inner side region A2 on the boundary of a tire equator line CL. It is more preferable that the void rate of the vehicle outer side region A1 is 75 to 93% of the void rate of the vehicle inner side region A2. If this value is too small, there is a tendency that a partial-abrasion inside of the vehicle is enlarged.

Specifically, it is preferable that the void rate of the vehicle outer side region A1 is between 25 and 35%, and the void rate of the vehicle inner side region A2 is between 30 and 40%. In the illustrated embodiment, there are formed four grooves in a circumferential direction, and five kinds of diagonal grooves, however, it is possible to regulate the void rate in accordance with a thickness and a forming density thereof in the present invention.

Further, the tread portion 4 has a boundary line TB of the rubbers having different hardness at a position A3 at which at least a cap rubber is 40 to 60% of a tread width W, and the rubber hardness in an outer side of the vehicle in the boundary line TB is equal to or more than the rubber hardness in an inner side of the vehicle. It is more preferable that the rubber hardness in the outer side of the vehicle in the boundary line TB is 105 to 117% of the rubber hardness in the inner side of the vehicle. If this value is too large, there is a tendency that the partial-abrasion in the inside of the vehicle is enlarged.

Specifically, it is preferable that the rubber hardness in the outer side of the vehicle in the boundary line TB is between 62 and 70 degree, and the rubber hardness in the inner side of the vehicle is between 57 and 65 degree. In this case, in the light of a durability, it is preferable that the boundary line TB of the rubbers having the different hardness is arranged in the groove bottom.

Other Embodiment (1) In the embodiment mentioned above, there is shown the example in which the reinforce rubber layer arranged on the inside of the vehicle is formed by two rubber layers, however, the reinforce rubber layer arranged on the inside of the vehicle may be formed by one rubber layer. In this case, on the inside of the vehicle, the reinforce rubber layer is arranged on the inside of the two carcass layers positioned in the sidewall portion.

(2) In the embodiment mentioned above, there is shown the example in which the carcass layer is constructed by two layers, however, in the present invention, the carcass layer may be constructed by one layer.

(3) In the embodiment mentioned above, there is shown the example having the tread pattern in which four grooves in the circumferential direction and five kinds of diagonal grooves are formed as shown in FIG. 2, however, the tread pattern is not particularly limited, but the void rate mentioned above is important.

Embodiment

A description will be given below of an embodiment specifically indicating a structure and an effect of the present invention. In this case, evaluation items in the embodiment are measured as follows.

(1) Cornering Power

A measurement is carried out under a condition that an internal pressure is 0 kPa, and a load is 50% of a total wheel weight in a so-called flat belt type cornering tester. A cornering power is evaluated by an index number in a state of setting the cornering power in a comparative example 1 to 100. The larger the index number is, the larger the cornering power is. Accordingly, this structure is preferable.

(2) Bead Unseating Resistance

There is carried out a so-called J-turn traveling in which a test tire is installed to a left front side of an actual car (Japanese 3000 cc class FR vehicle), and the car turns clockwise on a circular course having a radius of 20 m from a straight running state. Each of the test tires is set to a run-flat state having the internal pressure of 0 kPa, and the bead unseating resistance is evaluated on the basis of the running speed (which is in proportion to a side G) at a time when the rim unseating is generated. The running speed is started from 25 km/h, and the traveling is executed until the rim unseating is generated, in increments of 5 km/h. The evaluation is carried out on the basis of the index number by setting the comparative example 1 to 100, and the larger numerical value indicates the fact that the running speed at a time when the rim unseating is generated is high, that is, the bead unseating resistance is excellent.

(3) Mass

The mass is evaluated on the basis of a product tire weight. The evaluation is carried out on the basis of the index number by setting the comparative example 1 to 100, and the larger the numerical value indicates the fact that the tire weight is larger.

(4) Rolling Resistance

The rolling resistance is measured in a uniaxial type rolling resistance tester by assembling the trial tire in a rim having a size 18×8-JJ, and after charging an internal pressure 230 kPa. The rolling resistance is evaluated on the basis of an index number by setting the rolling resistance in the comparative example 1 to 100. The smaller the index number is, the smaller and more preferable the rolling resistance is.

(5) Partial-Abrasion

The partial-abrasion is compared on the basis of a ratio of abrasion amount between a center main groove and a shoulder main groove by installing the tire to the actual car (Japanese 3000 cc class FR car) and running on an open road at 12000 km. The ratio (between the shoulder main groove abrasion amount and the center main groove abrasion amount) being close to 1.0 indicates a uniform abrasion.

(6) Steering Stability

The steering stability is compared on the basis of a subjective evaluation by the actual car (Japanese 3000 cc class FR car). The steering stability is evaluated on the basis of an index number by setting the steering stability in the comparative example 1 to 100. The larger the index number is, the higher and more preferable the steering stability is.

(7) Riding Comfortableness

The riding comfortableness is compared on the basis of a subjective evaluation by the actual car (Japanese 3000 class FR car). The riding comfortableness is evaluated on the basis of an index number by setting the riding comfortableness in the comparative example 1 to 100. The larger the index number is, the better and more preferable the riding comfortableness is.

Embodiments 1 to 5

There are manufactured test tires having a structure shown in FIG. 1, having a rubber hardness of a vehicle outer side reinforce rubber layer, a rubber hardness of a vehicle inner side reinforce rubber layer, a difference of maximum thickness between both side reinforce rubber layers, void rate in an outer side of a vehicle/void rate in an inner side of the vehicle, and rubber hardness in the outer side of the vehicle/rubber hardness in the inner side of the vehicle shown in Table 1, and having a size 245/40R18. At this time, a boundary of the rubber of the tread in the embodiment 5 is set to a position which is 50% of the tread width from the outer side of the vehicle. The result of evaluation is shown in Table 1 in addition.

Comparative Example 1

There is manufactured a test tire having a double bead structure in both the outer side of the vehicle and the inner side of the vehicle, having a rubber hardness of a vehicle outer side reinforce rubber layer, a rubber hardness of a vehicle inner side reinforce rubber layer, a difference of maximum thickness between both side reinforce rubber layers, void rate in an outer side of a vehicle/void rate in an inner side of the vehicle, and rubber hardness in the outer side of the vehicle/rubber hardness in the inner side of the vehicle shown in Table 1, and having a size 245/40R18. The result of evaluation is shown in Table 1 in addition.

Comparative Example 2

There is manufactured a test tire absolutely having the same structure as the comparative example 1 except the structure in which the double bead structure is applied only to the outer side of the vehicle. The result of evaluation is shown in Table 1 in addition.

Comparative Example 3

There is manufactured a test tire absolutely having the same structure as the comparative example 1 except the structure having the double bead structure applied only to the outer side of the vehicle, having a rubber hardness of a vehicle outer side reinforce rubber layer, a rubber hardness of a vehicle inner side reinforce rubber layer, and a difference of maximum thickness between both side reinforce rubber layers as shown in Table 1. The result of evaluation is shown in Table 1 in addition.

Comparative Example 4

There is manufactured a test tire having the structure shown in FIG. 1, having a rubber hardness of a vehicle outer side reinforce rubber layer, a rubber hardness of a vehicle inner side reinforce rubber layer, a difference of maximum thickness between both side reinforce rubber layers, void rate in an outer side of a vehicle/void rate in an inner side of the vehicle, and rubber hardness in the outer side of the vehicle/rubber hardness in the inner side of the vehicle shown in Table 1, and having a size 245/40R18. At this time, a boundary of a rubber of a tread in the comparative example 4 is set to a position which is 50% of the tread width from the outer side of the vehicle. The result of evaluation is shown in Table 1 in addition.

TABLE 1

|  | Comparative example 1 | Comparative example 2 | Example 1 | Example 2 | Example 3 | Example 4 | Example 5 | Comparative example 3 | Comparative example 4 |
|---|---|---|---|---|---|---|---|---|---|
| IN side bead structure | double bead | SST | SST | SST | SST | SST | SST | SST | SST |
| OUT side PAD hardness (deg) | 77 | 77 | 77 | 72 | 72 | 72 | 72 | 60 | 72 |
| IN side PAD hardness (deg) | 77 | 77 | 77 | 80 | 83 | 83 | 83 | 92 | 83 |
| IN side PAD maximum thickness - OUT side PAD hardness maximum thickness (mm) | 0 | 0 | 1 | 0.5 | 1 | 1 | 1 | 2 | 1 |
| OUT side pattern VOID/IN side pattern VOID (%) | 100 | 100 | 100 | 100 | 100 | 90 | 90 | 100 | 70 |
| OUT side tread hardness/IN side tread hardness (%) | 100 | 100 | 100 | 100 | 100 | 100 | 110 | 100 | 120 |
| Cornering power | 100 | 96 | 103 | 103 | 103 | 105 | 112 | 97 | 115 |
| Bead disengagement | 100 | 96 | 103 | 103 | 103 | 106 | 108 | 98 | 108 |
| Mass * | 100 | 94 | 96 | 95 | 93 | 93 | 93 | 90 | 93 |
| Rolling resistance * | 100 | 100 | 100 | 96 | 94 | 94 | 94 | 92 | 94 |
| Partial abrasion ** | 1.25 | 1.64 | 1.2 | 1.25 | 1.18 | 1.28 | 1.35 | 1.69 | 1.65 |
| Steering stability | 100 | 93 | 103 | 103 | 103 | 106 | 110 | 95 | 97 |
| Ride quality | 100 | 97 | 105 | 107 | 105 | 105 | 103 | 95 | 98 |

\* small index number is good
\*\* value closer to 1.0 is good

As shown in the result of Table 1, in the run-flat tire in each of the embodiments, it is possible to achieve the reduction of the tire mass, the reduction of the rolling resistance and the improvement of the riding comfortableness while maintaining the bead unseating performance and the partial-abrasion resistant performance. Particularly, in the embodiment 4 in which the void rate in the outer side of the vehicle is set small, the cornering power is increased, and the steering stability and the bead unseating are improved. Further, in the embodiment 5 in which the hardness of the tread rubber in the outer side of the vehicle is enlarged, the cornering power is further increased, and the steering stability and the bead unseating are improved.

On the other hand, in the comparative example 2 in which the double bead structure is applied only to the outer side of the vehicle, the cornering power is lowered, the steering stability and the bead unseating are deteriorated, the riding comfortableness is deteriorated, and the reduction in each of the performances is significant. In this case, in the comparative example 3 in which the difference of the hardness of the reinforce rubber layer is too large, the partial-abrasion is generated, and the steering stability and the riding comfortableness are deteriorated, and in the comparative example 4 in which the void rate and the difference of the hardness of the tread rubber are too larger, the significant partial-abrasion is generated.

What is claimed is:

1. A run-flat tire comprising:
a pair of bead portions having an annular first bead;
inner and outer sidewall portions on an inner and outer side of a vehicle on which the run-flat tire is adapted to be mounted, respectively, extending to an outer side in a tire diametrical direction from said bead portions;
reinforce rubber layers arranged in said sidewall portions, said reinforce rubber layer in the inner side wall portion comprising one or more rubber layers, and said reinforce rubber layer on the outer side wall portion is constituted by a single layer;
a tread portion connecting outer peripheral side ends of said sidewall portions via shoulder portions,
wherein the run-flat tire comprises:
an annular inflating portion provided on the outside in a tire width direction of said bead portion arranged only on the outer side of the vehicle, and having an inner circumferential side face opposing to an outer circumferential curved side face of a rim flange when a regular rim is fixed; and
an annular second bead arranged at the annular inflating portion,
wherein the single reinforce rubber layer arranged in the outer sidewall portion has a rubber hardness of 60 to 82 degree, the one or more rubber layers of the reinforce rubber layer arranged in the inner sidewall portion have an average rubber hardness of 65 to 90 degree, and the one or more rubber layers of the reinforce rubber layer arranged in the inner sidewall portion has an average rubber hardness which is equal to or more than that of the single reinforce rubber layer arranged in the outer sidewall portion, and has a maximum thickness of all of the rubber layers which is larger than that of the single reinforce rubber layer arranged in the outer sidewall portion by at least 0.5 mm,
wherein a tread pattern formed in said tread portion is structured such that a void rate in the outer side of the vehicle is in a range of 75 to 100% of the void rate in the inner side of the tread portion on the boundary of a tire equator line, and
wherein the reinforce rubber layer arranged in the sidewall portion which is on the inner side of the vehicle has a rubber hardness larger than that arranged in the sidewall portion which is on the outer side of the vehicle by at least 5 degree.

2. A run-flat tire according to claim 1, wherein a tread pattern formed in said tread portion is structured such that a void rate in the outer side of the vehicle is less than a void rate in the inner side of the vehicle on the boundary of a tire equator line.

3. A run-flat tire according to claim 1, wherein said tread portion is structured such that at least a cap rubber has a rubber boundary line having a different hardness at a position which is 40 to 60% of the tread width, and the rubber hardness in the outer side of the vehicle of the boundary line is equal to or more than the rubber hardness in the inner side of the vehicle.

4. A run-flat tire according to claim 3, wherein the rubber hardness in the outer side of the vehicle of the boundary line is in a range of 105 to 117% of the rubber hardness in the inner side of the vehicle.

5. A run-flat tire according to claim 3, wherein the rubber hardness in the outer side of the vehicle of the boundary line is in a range of 62 to 70 and the rubber hardness in the inner side of the vehicle is in a range of 57 to 65.

6. A run-flat tire according to claim 1, wherein said tread portion is structured such that at least a cap rubber has a rubber boundary line having a different hardness at a position which is 40 to 60% of the tread width, and the rubber hardness in the outer side of the vehicle of the boundary line is more than the rubber hardness in the inner side of the vehicle.

7. A run-flat tire according to claim 1, wherein the annular inflating portion is mainly constituted of a rubber having hardness in a range of 66 to 76.

8. A run-flat tire according to claim 1, wherein the reinforce rubber layer arranged on the inside of the vehicle has a maximum thickness which is larger than that on the outside of the vehicle by 0.8 to 1.5 mm.

9. A run-flat tire according to claim 1, wherein the reinforce rubber layer arranged in the sidewall portion which is on the outer side of the vehicle has a maximum thickness in a range of 9 to 12 mm, and the reinforce rubber layer arranged in the sidewall portion which is on the inner side of the vehicle has a maximum thickness in a range of 9.8 to 13.5 mm.

10. A run-flat tire according to claim 1, wherein the void rate in the outer side of the vehicle is in a range of 75 to 93% of the void rate in the inner side of the tread portion.

11. A run-flat tire according to claim 1, wherein the void rate in the outer side of the vehicle is in a range of 25 to 35% and the void rate in the inner side of the vehicle is in a range of 30 to 40%.

12. A run-flat tire comprising:
a bead portion on the outer side of the vehicle, a sidewall portion on the outer side of the vehicle, and a shoulder portion on the outer side of the vehicle, which are sequentially connected in a tire outward diametrical direction;
a bead portion on the inner side of the vehicle, a sidewall portion on the inner side of the vehicle, and a shoulder portion on the inner side of the vehicle, which are sequentially connected in a tire outward diametrical direction;
a tread portion connecting the shoulder portion on the outer side of the vehicle and the shoulder portion on the inner side of the vehicle; and
reinforce rubber layers arranged in said sidewall portions, said reinforce rubber layer on the inner side of vehicle comprising one or more rubber layers, and said reinforce rubber layer on the outer side of vehicle is constituted by single layer
wherein the single reinforce rubber layer arranged in the sidewall portion which is on the outer side of the vehicle and has a rubber hardness of 60 to 82 degree, and one or more rubber layers of the reinforce rubber layer arranged in the sidewall portion which is on inner side of the vehicle and has an average rubber hardness of 65 to 90 degree which is more than that of the single reinforce rubber layer in the sidewall portion which is on outer side of the vehicle, said reinforcing rubber layer arranged in the sidewall portion which is on inner side of the vehicle having a maximum thickness of all of the rubber layers which is larger than that of the single reinforce rubber layer arranged in the sidewall portion which is on outer side of the vehicle by at least 0.5 mm, wherein a tread pattern formed in said tread portion is structured such that a void rate in the outer side of the vehicle is in a range of 75 to 100% of the void rate in the inner side of the tread portion on the boundary of the a tire equator line.

13. A run-flat tire according to claim 12, wherein an annular inflating portion is provided in the outside bead portion for receiving a rim flange only on the outer side of the vehicle.

14. A run-flat tire according to claim 13, wherein the outside bead portion includes a first annular bead and the annular inflating portion includes a second annular bead.

15. A run-flat tire according to claim 12, wherein the tread portion has a boundary line in a circumferential direction, and an outer side from the boundary line in a tire width direction has rubber hardness which is more than that in an inner side from the boundary line, with respect to an area within 40 to 60% of the tread width.

* * * * *